United States Patent Office 3,080,280
Patented Mar. 5, 1963

3,080,280
DISPERSANT COMPOSITIONS AND TOXICANT
CONCENTRATES CONTAINING THE SAME
Paul L. Lindner, Evanston, Ill., assignor to Witco Chemical Company, Inc., New York, N.Y., a corporation of Delaware
No Drawing. Filed Mar. 20, 1961, Ser. No. 96,662
26 Claims. (Cl. 167—42)

My invention relates to the production of new and useful dispersant compositions and to liquid biocidal toxicant compositions, particularly in the form of toxicant concentrates, containing said dispersants.

It has been found to be highly desirable, in certain situations, to be able to apply to an earth soil, in which plant or vegetable life is grown or contemplated to be grown, both water-soluble fertilizer material and also a desired pesticide, to wit, water-insoluble organic solvent-soluble insecticide or soil fumigant, hereafter generically called biocidal toxicant, in the form of a single composition. Efforts to provide such a composition, for instance, in the form of a stable, mobile, pourable or pumpable liquid emulsion, by simple mixing, present certain serious problems. The water-soluble fertilizer materials comprise water-soluble compounds, typical examples of which are potassium chloride, potassium nitrate, ammonium nitrate, ammonium sulphate, potassium sulphate, ammonium phosphate, and urea, with or without supplemental materials.

When dissolved in water to form strong solutions, particularly solutions approximating concentrated solutions, constituting the aqueous phase, and admixed with biocidal toxicant concentrates containing biocidal toxicants dissolved in organic solvents and insoluble in said aqueous phase, or solutions of such biocidal toxicants in organic solvents wherein said latter solutions, constituting the oleaginous phase, are insoluble in said aqueous phase, unstable dispersions form which readily and promptly separate out in the form of layers. Efforts to emulsify such aqueous phases and such oleaginous phases by means of usual types of emulsifying agents used in the toxicant emulsion field have proved entirely unsatisfactory. Non-ionic emulsifiers of the type of the polyoxyethylene derivatives of lipophillic materials, for instance, polyethylene glycol ethers of sorbitan monostearate, polyethylene glycol ethers of sorbitan monooleate, alkyl phenoxy polyoxyethanols, iso-octyl phenol polyoxyethylene ethers, and the like, have been found to be ineffective since they are salted out by the strong electrolytes in the high concentrations used in liquid fertilizer solutions. Similarly, higher alkyl aryl sulfonates, such as alkali metal, ammonium, magnesium or calcium salts of dodecyl benzene sulfonate, and the like, have likewise been found to be entirely unsatisfactory, whether used in conjunction with the non-ionic emulsifiers of the type mentioned above or by themselves.

The problem of providing satisfactory emulsions of aqueous liquid fertilizer solutions, particularly strong solutions, containing upwards of 20% of water-soluble fertilzer ingredients such as the monovalent and polyvalent ionic compounds described above and up to saturated aqueous solutions of said fertilizer solutions, with water-insoluble organic solvent-soluble biocidal toxicants has, so far as I am aware, not remotely been solved by others despite intensive efforts to do so. In certain instances, by means of special combinations of ingredients, it has been possible to prepare liquid fertilizer-biocidal toxicant compositions, but these must be prepared immediately prior to being used and must be used promptly since, among other things, their stability is of extremely short duration. Other special combinations of ingredients have been suggested, for instance, which are of use in liquid fertilizer-biocidal toxicant compositions but only if the liquid fertilizer contains trivalent phosphate ions and urea. In the presence of monovalent ions such as chlorides or nitrates, such latter compositions are of no commercial value because the emulsifying action of the combination of ingredients is destroyed.

I have discovered new and useful biocidal toxicant concentrates (and dispersant compositions for use therein) which, when admixed, by simple mixing, with liquid fertilizer compositions in the form of strong aqueous solutions, say in excess of 20% concentration up to saturation, produce homogeneous emulsions or dispersions which remain usable for periods of the order of at least several hours. My invention makes it unnecessary to pre-mix the biocidal toxicant concentrate with water just prior to admixing it with the liquid fertilizer solution, as is required with certain heretofore known biocidal toxicant concentrates. All that is necessary, in the case of biocidal toxicant concentrates made in accordance with my invention, is simple mixing or agitation with the liquid fertilizer solution. Moreover, my novel biocidal toxicant concentrates can effectively be used with liquid fertilizer compositions irrespective of whether the latter contain monovalent or polyvalent ions, and they are also usable with more dilute solutions of liquid fertilizers as, for instance, those containing of the order of 10 to 15% of solids. Thus, they have a universality of utility which is a most important practical consideration.

I have discovered, in accordance with my present invention, that if there are utilized, in admixture, certain materials falling into two separate classes, and which are employed in certain ratios with respect to each other, all as is hereafter described in detail, a synergistic effect is obtained which brings about the entirely unpredictable and unexpected results which are achieved by my present invention.

The first of these ingredients, which for convenience, may be called the (a) ingredient, comprises a compound which is a sulfopolycarboxylic acid ester of an ethylene oxide or propylene oxide condensation product or adduct of a higher molecular weight amine in which the amine contains a hydrocarbon radical, usually an alkyl radical, having from 8 but more advantageously from 12 or 16 to 26 carbon atoms, and in which both the sulfonic group and free carboxyl group or groups in each sulfopolycarboxylic acid radical is neutralized by an amine, or in which either the sulfonic group or the free carboxyl group or groups in each sulfopolycarboxylic acid radical is neutralized by an amine and the hydrogen in the other or others of said groups is replaced by an alkali metal. The ethylene oxide is present in the molecule of the (a) ingredient in number up to 25 groups and most advantageously from 1 or 2 to 10 groups. Where propylene oxide is used in place of ethylene oxide, the number of propylene oxide groups should not exceed 10 and more advantageously should lie within the range of 1 to 2. Alternatively, the molecule of the (a) ingredient may contain both ethylene oxide and propylene oxide groups, as, for example, from 1 to 5 ethylene oxide or ethenoxy groups and from 5 to 1 propylene oxide or propenoxy groups. The ethenoxy or propenoxy group or groups need not, however, be introduced into the molecule of the long chain amine through the use of ethylene oxide or propylene oxide. The manner in which this is achieved forms no part of the present invention.

Thus, various of the (a) compounds are sulfopolycarboxylic acid esters of an alkylene oxide adduct of a higher molecular weight amine in which the amine contains a hydrocarbon radical having from 8 to 26 carbon atoms, said alkylene oxide being selected from the group consisting of ethylene oxide and propylene oxide subject to the proviso that the number of mols of alkylene oxide per mol of higher molecular weight amine does not exceed 25 when the alkylene oxide is ethylene oxide and does not exceed 10 when the alkylene oxide is propylene oxide, the sulfopolycarboxylic acid radical being represented by the formula $$-OC-Y(-COOM)_n$$
$$\;\;\;\;|$$
$$\;\;SO_3M'$$

wherein Y is the completely decarboxylated residue of a polycarboxylic acid; M and M' are members of the group consisting of alkali metals and organic substituted ammonium radicals with the proviso that at least one of them is an organic substituted ammonium radical; and $n$ is 1 to 3.

Certain of the said (a) ingredients can be represented by the formula

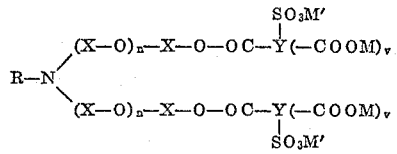

where R is an aliphatic hydrocarbon radical containing from 8 and more advantageously from 12 or 16 to 26 carbon atoms, X is an alkylene radical selected from the group consisting of $C_2H_4$ and $C_3H_6$, Y is the completely decarboxylated residue of a polycarboxylic acid containing from 4 to 8 carbon atoms, M and M' are members selected from the group consisting of alkali metals and organic substituted ammonium radicals with the proviso that at least one of them is an organic substituted ammonium radical, $n$ is from 1 to 25 when X is $C_2H_4$ and from 1 to 10 when X is $C_3H_6$, and $v$ is 1 to 3.

Others of said (a) ingredients can be represented by the formula

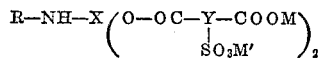

where R is an aliphatic hydrocarbon radical containing from 8 and more advantageously from 12 or 16 to 26 carbon atoms, X is $-CH_2-CH-CH_2-$, Y is the completely decarboxylated residue of a polycarboxylic acid containing from 4 to 8 carbon atoms, and M and M' are members selected from the group consisting of alkali metals and organic substituted ammonium radicals with the proviso that at least one of them is an organic substituted ammonium radical.

The radical R of said (a) ingredient is derived from amines, notably aliphatic amines, containing from 8 and better still from 12 or 16 to 26 carbon atoms and in which there is a long chain hydrocarbon containing at least 8 and better still at least 12 or 16 carbon atoms. Typical of such amines are octyl amines, decyl amines, dodecyl amine, tetradecyl amine, hexadecyl amine, oleyl amine, linoleyl amine, stearyl amine, ricinoleyl amine, palmitoleyl amine, abietyl amine, 2-n butyl octyl amine, 2-butyl tetradecyl amine, melissyl amine, cottonseed oil fatty-propyl amines, corn oil fatty-butyl amines, coconut oil fatty-ethyl amines, soya oil fatty amine-propyl amines, and tall oil amine-propyl amines.

The polycarboxylic acids, the sulfo-derivatives of which are employed in the preparation of the (a) ingredient, can be chosen from a large group, typical or illustrative examples of which are maleic acid, fumaric acid, tartaric acid, glutaconic acid, itaconic acid, adipic acid, phthalic acid, sebacic acid, citric acid, aconitic acid, tricarballylic acid, and glutaric acid. Of particular utility are the aliphatic sulfopolycarboxylic acids, especially the water-soluble sulfodicarboxylic acids containing from 4 to 8 carbon atoms. The sulfosuccinic acid derivatives are particularly preferred.

The salt-forming radicals represented by M or M' comprise, in the case of M, alkali metals (which term is here used to mean sodium, potassium, lithium and ammonium); and in the case of M and M', organic substituted ammonium radicals. The latter, which most advantageously are water-soluble lower molecular weight amines, may be selected from a wide group, typical examples of which are dimethylamine; diethylamine; triethylamine; propylamine; monoisopropylamine, diisopropylamine, triisopropylamine, and commercial mixtures of said isopropylamines; butyl amine; amyl amine; monoisopropanolamine, diisopropanolamine, triisopropanolamine and commercial mixtures of said isopropanolamines; ethanolamines such as monoethanolamine, diethanolamine, triethanolamine, and commercial mixtures thereof; polyamines such as aminoethyl ethanolamine, ethylenediamine, diethylenetriamine, hydroxyethyl ethylenediamine, and hexamethylenediamine; hexylamine; cyclohexylamine; dimethylbenzylamine, benzylamine; morpholine; methylcyclohexylamine; alkyl alkanolamines such as ethyl diethanolamine and diethyl ethanolamine; furfurylamine; piperidine; 2-amino-2-methyl-1-propanol; 2-amino-1-butanol; methyl piperidine, and the like; as well as long chain amines such as octyl amine, dodecyl amine, hexadecyl amine, octadecyl amine, soya amines, soya-propyl amines, and the like; and compatible mixtures of any two or more thereof.

With reference to said first or (a) ingredient, it will be seen that, in the case of sulfodicarboxylic acid ester derivatives, the said salt may be the organic substituted ammonium di-salt, that is, where both M and M' are organic substituted ammonium radicals, which may be the same or different organic substituted ammonium radicals; or the said salt may be a half alkali metal and half organic substituted ammonium salt which is the case where M is an alkali metal and M' is an organic substituted ammonium radical. Of particular utility, as the first ingredient, are the organic substituted ammonium di-salts and the half ammonium half organic substituted ammonium salts of the sulfosuccinic acid esters of the ethenoxy or propenoxy derivatives of the long chain amines wherein said latter amines, as stated, contain a hydrocarbon chain of at least 8 carbon atoms. In the case of the sulfotricarboxylic acid esters, the said salt may be the organic substituted ammonium tri-salt, that is, where both M and M' are organic substituted ammonium radicals, which may be the same or different organic substituted ammonium radicals; or the said salt may be a one-third alkali metal and two-thirds organic substituted ammonium salt, in which case M is an organic substituted ammonium radical and M' is an alkali metal; or vice versa, that is, said salt may be a two-thirds alkali metal and one-third substituted ammonium salt, in which case M is an alkali metal and M' is an organic substituted ammonium radical.

Illustrative examples of said (a) ingredient are the following (which include, also, the isomers thereof):

(1)

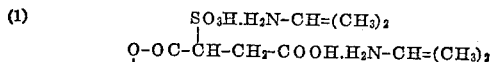

Isopropylamine salt of soya amine propylene glycol disulfonsuccinate where R is the alkyl group of a soya amine radical (containing a chain of predominately 18 carbon atoms).

(2)

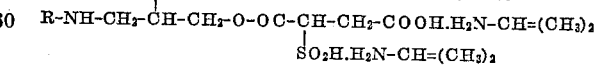

Isopropylamine salt of disulfosuccinic acid ester of 20 mol ethylene oxide adducts of coconut amines where R is the alkyl group of a coconut amine (containing a chain of predominately $C_{12}$ and $C_{14}$ carbon atoms).

(3)

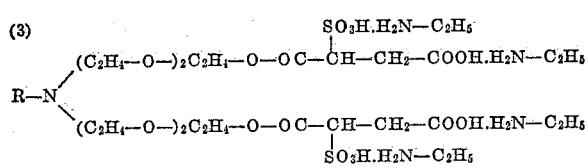

Diethylamine salt of disulfosuccinic acid ester of 6 mol ethylene oxide adduct of soya amines where R is the alkyl group of a soya amine radical (containing a chain of predominately 18 carbon atoms).

(4)

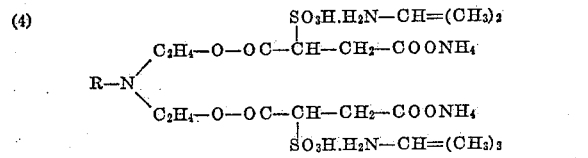

Half ammonium half isopropylamine salt of disulfosuccinic acid ester of 2 mol ethylene oxide adduct of soya amines where R is the alkyl group of a soya amine radical (containing a chain of predominately 18 carbon atoms).

(5)

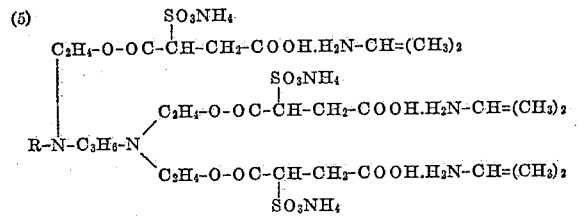

Half ammonium half isopropylamine salt of triple sulfosuccinic acid ester of 3 mol ethylene oxide adduct of tall oil amine propyl amine where R is the alkyl group of a tall oil amine radical (containing a chain of predominately 18 carbon atoms).

(6)

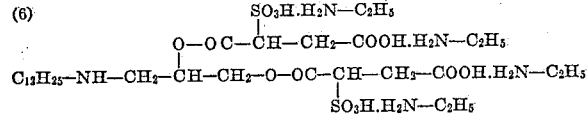

Di-ethylamine salt of dodecyl amine propylene glycol disulfosuccinate (7)

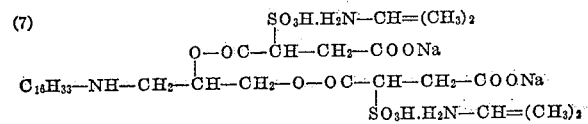

Half sodium half isopropyl amine salt of hexadecyl amine propylene glycol disulfosuccinate (8)

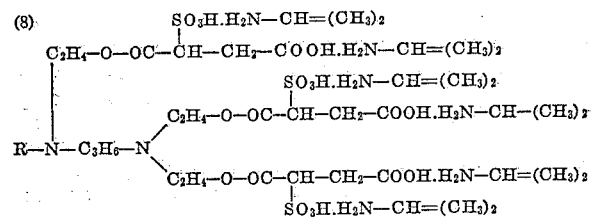

Di-isopropyl amine salt of the triple sulfosuccinic acid ester of ethylene oxide adduct of soya fatty amine-propyl amine (R—NH— being the soya fatty amine radical)

(9)

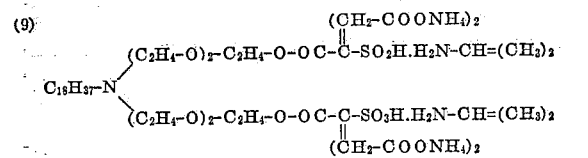

Two-thirds ammonium one-third isopropylamine salt of the sulfotricarballylic acid ester of the 6 mol ethylene oxide adduct of stearyl amine (10)

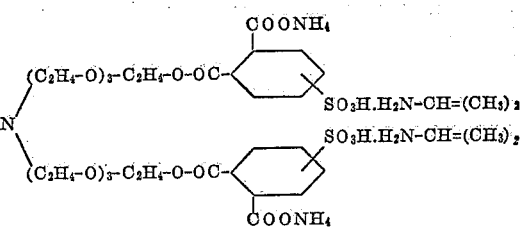

Half ammonium half isopropylamine salt of the sulfophthalic acid ester of the 8 mol ethylene oxide adduct of hexadecyl amine (11)

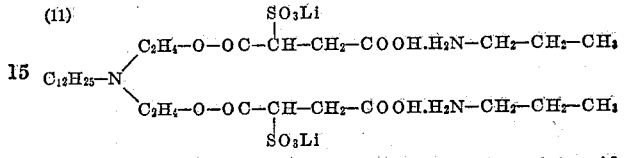

Half lithium half n-propylamine salt of the sulfosuccinic acid ester of the 2 mol ethylene oxide adduct of dodecyl amine (12)

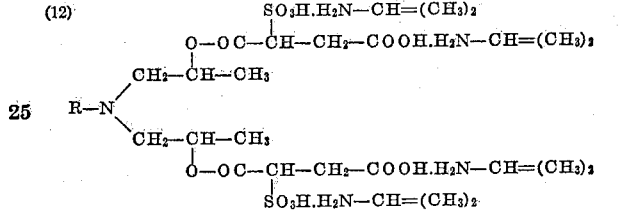

Isopropylamine salt of disulfosuccinic acid ester of 2 mol propylene oxide adduct of hexadecyl amine where R is the alkyl group of hexadecyl amine It is not material to the success of my invention which of the M or the M' cation is an organic substituted ammonium radical but, as stated above, one of them should be an alkali metal and the other should be an organic substituted ammonium radical, or, in the broader aspect of my invention as I have shown, both M and M' can be an organic substituted ammonium cation. In the formulae given above and in the claims for the (a) ingredient, it will be understood that the M and M' may be interchanged, that is, the M cation may be attached to the $SO_3$ radical and the M' cation may be attached to the free carboxyl group of the maleic acid radical, and the claims should be so read.

The (a) compounds can be prepared by reacting an adduct of ethylene oxide, or propylene oxide, or mixtures thereof, as the case may be, of a long chain amine, for instance, dodecyl amine or soya amines. The resulting oxyalkylated (oxyethylated or oxypropylated) long chain amine can then be esterified with a sulfopolycarboxylic acid. This is advantageously done, in the case of the sulfosuccinic acid esters, by reacting the oxyalkylated amine with maleic anhydride and then with an aqueous solution of a bisulfite salt. Illustrative examples of the preparation of typical compounds of the (a) group are set forth below:

EXAMPLE I (a) 200.5 g. of a diethoxylated soya amine ("Ethomeen S12"—Armour & Company), which contains two hydroxyl groups for each amine group in the molecule, are dissolved in 120 g. of xylene. To this solution 103.2 g. of powdered maleic anhydride are slowly added. The reaction temperature is held for 3 hours at 84–89 degrees C. Titration shows that all the available hydroxyl groups reacted to form the maleic acid mono ester.

(b) A mixture of 135 g. of a 73.3% aqueous solution of ammonium bisulfite, 45 g. water, 58.2 g. isopropyl-amine, 116.8 g. n-propanol, and 15 g. xylene are heated to 82 degrees C. To this mixture is added 405 g. of the above-prepared (a) solution, stirring at such a rate that the reaction temperature does not rise above 84 degrees C. The reaction product forms a clear solution in the above mixture of n-propanol and water. It is also soluble in most pesticide concentrates. It can be used directly in the preparation of the compositions of my present invention, or it may be recovered from the reaction mixture, purified if desired, although such is unnecessary, and then used in the compositions of my invention. The compound produced by this example is the half ammonium half isopropylamine salt of the disulfosuccinic acid ester of diethoxylated soya amines.

EXAMPLE II (a) To 109.6 g. distilled soya amines ("Armeen SD"—Armour & Company), which represents 0.4 mol by titration, there are added 47.7 g. of a 92.85% glycerol alpha-mono chlorohydrin (analyzed as 0.4 mol). This mixture is heated for 2 hours to 140–150 degrees C., after which time at least 80% reaction has taken place. 150 g. xylene and a solution of 12.2 g. NaOH in 12.2 g. water are added; the water is removed by azeotropic distillation. The NaCl is filtered off and the xylene removed by distillation. The yield is 133.5 gms. The product thus obtained contains two hydroxyl groups for every amine group, the latter being a secondary amine.

(b) To the above reaction product, 82.4 g. of maleic anhydride (0.84 mol) are slowly added. The reaction mixture is kept for 3 hours at 80 degrees C. This maleate monoester is slowly added, keeping the temperature at 80–84 degrees C., to a mixture prepared from:

173.5 g. of a 46.5% ammonium bisulfite solution in water
49.6 g. of isopropylamine
99.3 g. n-propanol To this is later added a mixture of 10 g. of n-propanol plus 10 g. of benzene, to obtain a clear solution of the reaction product. The yield is 568 gms. of a 62.5% active half ammonium half isopropylamine salt of soya amine propylene glycol disulfosuccinate. The reaction mixture containing this compound is usable as such in the preparation of the compositions of my present invention.

EXAMPLE III (a) 101.8 g. of a tall oil amine propylamine ethoxylated with 3 mols of ethylene oxide ("Ethoduomeen T13"—Armour & Company) are dissolved in 150 g. of xylene. To this solution 58 g. of maleic anhydride are slowly added. The reaction is spontaneous. The mixture is kept for 3.5 hours at 85 degrees C. The theoretical acidity for the maleic acid monoester would be 1.91 meq./g. The acidity found is 1.904 meq./g., or practically 100% reaction.

(b) This tri-maleate is slowly added, keeping the reaction temperature at 80 degrees C., to a neutralized solution of 80 g. ammonium bisulfite containing 592 millimoles $SO_2$, 29 g. water, 12 g. isopropylamine (203.4 meq./g.), and 58 g. of n-propanol. The yield of a 47% active trisulfosuccinate is 486 g. which represents an 89% sulfonated product. This product is a mixture of inner salts and isopropylamine salts of a trisulfosuccinic acid ester of ethoxylated tall oil amine propyl amine. The xylene is removed.

EXAMPLE IV (a) 118.2 g. of distilled technical dodecyl amine ("Armeen D12"—Armour & Company) (600 meq./g.), 73.5 g. of technical glycerol-alpha-monochlorhydrin (602.7 meq./organic chlorine+33.8 meq. HCl which is an impurity), and 2.4 g. $Na_2CO_3$ (45.3 meq.) are heated under reflux at 127 degrees C. for 2½ hours at which time the reaction is 66% completed as shown by analysis. 20 g. $Na_2CO_3$ (377.4 meq.) and an additional 76.3 g. of the glycerol-alpha-monochlorohydrin (625 meq. organic Cl and 35.1 meq. HCl) are added; the mixture is slowly heated, increasing the temperature over a 3-hour period from 35 degrees C. to 115 degrees C. The heating is continued for 2 hours under reflux at 115–119 degrees C. 131 g. $Na_2CO_3$ (246.2 meq.) are added and the mixture is heated under reflux for 10 hours at 115–119 degrees C. The sample, on testing, shows an 87.5% reaction.

(b) The following mixture is then added: 25.5 g. NaOH, 126.7 g. water, 60 g. n-propanol, and 40 g. xylene. An oily liquid separates and is washed 6 times with 200 ml. portions of brine solution. The xylene is distilled off under reduced pressure. 206.8 g. of a waxy pleasant-smelling material are obtained, which showed an acetylation value of 9.54 meq./g. and an amine value of 2.34 meq./g., indicating a 4:1 ratio of hydroxyl groups to amine. The yield is 82.3% of theory.

(c) The intermediate produced in part (b) hereof can be reacted with one, two, three or four mols of maleic anhydride in the manner described in the foregoing examples and converted into the corresponding sulfosuccinates, again as described in said foregoing examples.

The (a) ingredient is advantageously water-soluble or readily water-dispersible, although in its broader aspects it may be soluble in the organic solvents utilized in the production of the toxicant compositions contemplated by my invention.

The second of said ingredients, which may, for convenience, be called the (b) ingredient, is an amine salt of an alkyl benzene sulfonic acid in which the alkyl radical contains from 12 to 18 carbon atoms. The alkyl radical, which is advantageously predominately a single higher alkyl radical, may be derived from polypropylenes, kerosene fractions, or the like, contains predominately from 12 to 18 carbon atoms, and, especially, predominately from 12 to 15 carbon atoms. The benzene nucleus may also contain lower alkyl substituents, provided that the number of carbon atoms in such lower alkyl constituents is in the range of from 1 to 3 and the number of such lower alkyl substituents does not exceed 2. The number of sulfonic acid radicals in the benzene nucleus may be 1 or 2, but, especially, there is only approximately one sulfonic acid radical in the benzene nucleus. The (b) ingredient should be soluble in the organic solvents, such as the aromatic solvents, used in the production of the toxicant concentrates.

Certain of the higher alkyl benzene sulfonic acids which, in the form of their organic amine salts, are employed as the (b) ingredient in the practice of my invention can be represented by the formula

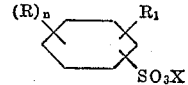

where R is a lower alkyl radical containing from 1 to 3 carbon atoms, such as methyl, ethyl, propyl and isopropyl, $R_1$ is a higher alkyl radical containing from 12 to 18 carbon atoms and especially from 12 to 15 carbon atoms, $n$ is zero to 2, and X is an organic amine cation.

Typical examples of the organic amines whose salts of the higher alkyl benzene sulfonic acids are employed as the (b) ingredient in accordance with my present invention are those which have been mentioned above as being representative of M' in the general formula for the (a) ingredient. Particularly preferred are the alkyl amines containing from 1 to 6 carbon atoms and the polyamines such as propylenediamine, diethylene triamine and the like, and especially preferred is isopropyl amine. Typical or illustrative examples of the organic amine salts of the higher alkyl benzene sulfonic acids the use of which is encompassed by my invention are the following: diisopropanolamine salt of dodecyl benzene mono-sulfonic acid; isopropylamine salt of dodecyl benzene mono-sulfonic acid; dimethylamine propylenediamine salt of dodecyl benzene mono-sulfonic acid; diisopropylamine salt of dodecyl toluene mono-sulfonic acid; furfurylamine salt of pentadecyl benzene mono-sulfonic acid; cyclohexylamine salt of dodecyl mono-sulfonic acid; diisopropylamine salt of dodecyl isopropyl benzene sulfonic acid;

morpholine salt of octadecyl benzene mono-sulfonic acid; and mixtures of two or more thereof. The isopropylamine salt of dodecyl benzene mono-sulfonic acid is unusually satisfactory as the (b) ingredient and its use, in the combinations here involved, represents an important, though limited, embodiment of my invention.

It will be understood, of course, that mixtures of any two or more of the (a) and any two or more of the (b) ingredients can be employed in the practice of my present invention; and, also, that the said (a) and (b) ingredients can be utilized in the form of impure reaction products containing high percentages of the active constituents thereof.

The biocidal toxicants which are used in accordance with my present invention and which, as stated above, comprise insecticides and soil fumigants, may be selected from a wide group typical examples of which are "Aldrin" (1,2,3,4,10,10-hexachloro-1,4,4a,5,8,8a-hexahydro-1,4,5,8-dimethanonaphthalene); "Dieldrin" (1,2,3,4,10,10-hexachloro - 6,7-epoxy,1,4,4a,5,6,7,8,8a-octahydroxy-1,4-endo-exo - 5,8 - dimethanonaphthalene); "Lindane" (gamma isomer of benzene hexachloride); "Heptachlor" (1,4,5,6,7,8,8 - heptachloro - 3a,4,7,7a - tetrahydro-4,7-endo-methanoindene); "Nemagon" (1,2 - dibromo-3-chloropane); ethylene dibromide; DDT; organic thiocyanates such as B-butoxy, B'-thiocyanodiethyl ether, bornyl thiocyanoacetate; trichlorobenzene; propyl, butyl, and amyl ethers of pentachlorophenol, and the like, and compatible mixtures of any two or more thereof. Of especial importance are "Aldrin," "Dieldrin," "Lindane," "Heptachlor," and "Nemagon."

The organic solvent which is utilized in the preparation of the biocidal toxicant concentrates of my present invention, and in which the biocidal toxicant is soluble, may be selected from a known group of such organic solvents. Such organic solvents are of the type which are insoluble in the aqueous phase and, at least in most cases, will be per se insoluble in water. For convenience, said organic solvents are referred to herein as being "water-insoluble," and the same is true of the biocidal toxicants, although the criterion is essential insolubility in the aqueous phase of the emulsion. These include, for instance, aromatic hydrocarbon solvents, or blends thereof with paraffinic or naphthenic solvents. Examples of such solvents are kerosene; light refined mineral oil; methyl-naphthalenes such as monomethyl naphthalene, dimethyl naphthalene and trimethyl naphthalene; ethyl naphthalene; 2-methylpentanediol-1,2; dipropylene glycol methyl ethers; benzene, toluene, aromatic naphthas, xylene, tetrahydronaphthalene, cyclohexane, and the like. These and various other organic solvents are frequently sold under trade names, such as "Cyclosol 53," which is a xylene type solvent; and "Sovacide 544C" which is an aromatic petroleum oil containing methylated naphthalenes.

The (a) and (b) ingredients are incorporated into solutions of the biocidal toxicants in the selected organic solvent or mixtures of organic solvents to produce biocidal toxicant concentrates. Typical of such biocidal toxican concentrates are so-called concentrates containing, for instance, 2 pounds "Heptachlor" per gallon; 1.5 pounds "Dieldrin" per gallon; 1 pound gamma equivalent benzene hexachloride per gallon; and 45% "Nemagon" concentrates. The content of the total of the (a) and (b) ingredients, by weight of the biocidal toxicant concentrate, will fall within the range of 3 to 30%, but, ordinarily, from 6 to 15%, and, particularly, from 8 to 12%, will be found quite satisfactory for most purposes. The relative proportions of the (a) and (b) ingredients, or, in other words, the weight ratio of the (a) to the (b) ingredient, should be at least 2 to 1, and is usually in the range of about 2 to about 20, preferably on an average of about 4 to 10, parts of the (a) ingredient to 1 part of the (b) ingredient. The upper limit of the (a) ingredient may, if desired, be at least several times the values recited above. Within the limits stated, the proportions of ingredients may be varied in order to obtain optimum results in connection with any particular liquid fertilizer solution.

The percentages or proportions of the (a) and (b) ingredients, as set forth above, are predicated on their being pure substances. In actual commercial practice, the (a) and (b) ingredients as prepared will not be in pure form and, indeed, it is unnecessary that they be used in pure form. Thus, for instance, in the case of the (a) ingredient used in Example A, it may be prepared in the form of an approximately 50% or 60% to 65% or 75% active product, and the (b) ingredient used in said Example A is commonly prepared in the form of an approximately 95% active product. In using such unpurified reaction mixtures comprising the (a) and (b) ingredients, account should be taken of the active ingredient content thereof in selecting the percentages thereof to be used.

The liquid fertilizer solutions (with which the hereinabove described biocidal toxicant concentrates are admixed to form homogeneous emulsions or dispersions which are usable over periods of at least several hours) are, per se, well known in the art. They comprise aqueous solutions, usually strong or concentrated aqueous solutions even up to saturation, of water-soluble compounds which fall into the category of providing at least one of the elements potassium, nitrogen and phosphorous, including, among others, as previously pointed out, potassium chloride, potassium nitrate, potassium sulphate, ammonium nitrate, ammonium sulphate, ammonium phosphate, aqueous ammonia, and the like, as well as organic water-soluble fertilizer materials particularly in conjunction with the inorganic water-soluble salts, such as those mentioned above, an especially preferred example of such organic water-soluble fertilizer material being urea. The liquid fertilizers, which will normally include one or more of the aforementioned materials, may be standardized as to their nitrogen, phosphorus (as $P_2O_5$) and potassium (as $K_2O$) contents. Typical examples of liquid fertilizer solutions, which can be used in conjunction with the novel biocidal toxicant concentrates of my invention, are shown in a bulletin entitled "Preparation Of Liquid Fertilizers," second edition, published by Victor Chemical Works, Chicago, Illinois.

The following examples are illustrative of biocidal toxicant concentrates, and dispersant compositions for use therein, falling within the scope of my invention. Other specific embodiments will readily occur to those skilled in the art in the light of the guiding teachings and principles disclosed herein. All parts listed are by weight percent.

*Example A*

| | Parts |
|---|---|
| Heptachlor (72%) active | 43 |
| Xylene | 47 |
| Compound (1) (60% active) | 9.7 |
| Isopropylamine salt of dodecyl benzene sulfonic acid (95% active) | 0.3 |

*Example B*

| | |
|---|---|
| Dieldrin (99%) | 18 |
| Xylene | 72 |
| Compound (2) (60% active) | 6.7 |
| Isopropylamine salt of dodecyl benzene sulfonic acid (95% active) | 3.3 |

*Example C*

| | |
|---|---|
| Aldrin (90%) | 47 |
| Cyclosol 53 (Xylene type aromatic solvent) | 43 |
| Compound (4) (60% active) | 9.1 |
| Isopropylamine salt of dodecyl benzene sulfonic acid (95% active) | 0.9 |

Example D

| | Parts |
|---|---|
| Aldrin (90% active) | 47 |
| Xylene | 43 |
| Compound (5) (45% active) | 9.5 |
| Coconut amine propyl amine salt of dodecyl benzene sulfonic acid (75% active) | 0.5 |

Example E

| | |
|---|---|
| Dieldrin (99%) | 18 |
| Xylene | 72 |
| Compound (6) (70% active) | 8.8 |
| Isopropylamine salt of dodecyl benzene sulfonic acid (95% active) | 1.2 |

Example F

| | |
|---|---|
| Lindane (40% benzene hexachloride, gamma isomer) | 30 |
| Xylene | 60 |
| Compound (1) (60% active) | 8.8 |
| Dimethylamine propylenediamine salt of dodecyl benzene sulfonic acid (90% active) | 1.2 |

Example G

| | |
|---|---|
| Lindane (40% benzene hexachloride, gamma isomer) | 30 |
| Xylene | 60 |
| Compound (2) (60% active) | 9.0 |
| Isopropylamine salt of dodecyl toluene sulfonic acid (95% active) | 1 |

Example H

| | |
|---|---|
| Nemagon | 45 |
| Xylene | 45 |
| Compound (3) (60% active) | 9.2 |
| Isopropylamine salt of dodecyl benzene sulfonic acid (95% active) | 0.8 |

Example I

| | |
|---|---|
| Heptachlor (72% active) | 34 |
| Sovacide 544C | 56 |
| Compound (6) (60% active) | 9.1 |
| Isobutylamine salt of dodecyl toluene sulfonic acid (90% active) | 0.9 |

Example J

| | |
|---|---|
| Compound (1) (60% active) | 9.7 |
| Isopropylamine salt of dodecyl benzene sulfonic acid (95% active) | 0.3 |

Example K

| | |
|---|---|
| Compound (2) (60% active) | 6.7 |
| Isopropylamine salt of dodecyl benzene sulfonic acid (95% active) | 3.3 |

Example L

| | |
|---|---|
| Compound (4) (60% active) | 9.1 |
| Isopropylamine salt of dodecyl benzene sulfonic acid (95% active) | 0.9 |

Example M

| | |
|---|---|
| Compound (5) (45% active) | 9.5 |
| Coconut amine propyl amine salt of dodecyl benzene sulfonic acid (75% active) | 0.5 |

Example N

| | |
|---|---|
| Compound (1) (60% active) | 10 |
| Isopropylamine salt of dodecyl benzene sulfonic acid (95% active) | 2 |
| Xylene | 30 |

Example O

| | |
|---|---|
| Compound (3) (60% active) | 10 |
| Isopropylamine salt of dodecyl benzene sulfonic acid (95% active) | 2 |
| Cyclosol 53 (organic solvent) | 30 |

The weight ratio between the oleaginous phase, represented by the toxicant concentrate, and the aqueous phase, represented by the strong or concentrated aqueous solution of fertilizer ingredients, can range from 1 to 1 or up to 1 to 10. However, in the usual case of the use of the biocidal toxicant concentrates of my present invention, the amount of the liquid fertilizer solution will be many times the amount of the biocidal toxicant concentrate. In other words, most commonly the aqueous phase of the emulsion will be present in large excess over the oleaginous phase present in the biocidal toxicant concentrate. While such excess may vary somewhat, in the usual case it will be in the range of about 25 or 30 to 60 or even more times that of the oleaginous phase, but will usually be from about 30 to 40 times that of the oleaginous phase, all in terms of parts by weight.

In the use of the biocidal toxicant concentrates of my invention, the same are simply admixed with the aqueous or liquid fertilizer solution, with suitable agitation. For instance, 1 part of the toxicant concentrate of Example A is admixed, with stirring, with 30 parts of a liquid fertilizer solution comprising a 43% solution in water of liquid fertilizer (8–24–0 diammonium phosphate solution). In another typical example, 1 part of the toxicant concentrate of Example B is admixed with 30 parts of an about 80% aqueous fertilizer solution of Uran (32–0–0) comprising ammonium nitrate and urea. Again, 1 part of the toxicant concentrate of Example A is admixed with 30 parts of an 8–8–8 liquid fertilizer comprising a 39% solution made up of urea, diammonium phosphate and potassium chloride. Other illustrative commercial types of liquid fertilizer solutions with which my novel biocidal toxicant concentrates can be used are the so-called 8–25–0 (derived from ammonium phosphate); and 10–20–0 (derived from ammonium phosphate and urea).

The dispersant compositions of the present invention have unusual utility in connection with the production of toxicant concentrates for use in conjunction with aqueous solutions containing high concentrations of fertilizer ingredients, all as has been described above in detail. They have a broader utility, however, namely, in connection with the production of stable emulsions of oleaginous and aqueous materials in the presence of high concentrations of ionizable materials, notably, inorganic salts. It is well known that the presence of ionizable materials such as sodium chloride, sodium sulfate, magnesium chloride, magnesium sulfate and other monovalent and polyvalent inorganic salts, in oleaginous-aqueous emulsion systems, very seriously affects the stabilities of such emulsions, especially where the concentrations of said salts in the aqueous phase is of the order of even a few percent. The dispersant compositions of this invention make possible the production of stable emulsions even under the highly adverse environmental conditions of high concentrations of strongly ionizable salts.

Where reference is made to water-insoluble biocidal toxicants, it will be understood that such is intended to encompass biocidal toxicants which are insoluble in water as well as biocidal toxicants which are insoluble in the liquid fertilizers per se irrespective of their solubility in water per se.

What I claim as new and desire to protect by Letters Patent of the United States is:

1. A dispersant composition, having the property of being soluble in organic solvent solutions of water-insoluble biocidal toxicants, comprising (a) a compound in the form of a sulfopolycarboxylic acid ester of a higher molecular weight amine in which the amine contains a hydrocarbon radical having from 8 to 26 carbon atoms and in which amine there is present at least one hydroxy alkylene radical selected from the group consisting of hydroxy ethylene and hydroxy propylene, said sulfopolycarboxylic acid radical being ester-linked through the hydroxy group of said hydroxy alkylene radical, the sulfopolycarboxylic acid radical being represented by the formula

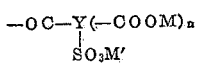

wherein Y is the completely decarboxylated residue of a polycarboxylic acid; M and M' are members of the group consisting of alkali metals and organic substituted ammonium radicals with the proviso that at least one of them is an organic substituted ammonium radical; and $n$ is 1 to 3; and (b) an alkyl amine salt of an alkyl benzene sulfonic acid corresponding to the formula

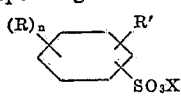

where R is a lower alkyl radical containing from 1 to 3 carbon atoms, R' is a higher alkyl radical containing from 12 to 18 carbon atoms, $n$ is zero to 2, and X is an organic amine cation, the weight ratio of said (a) to said (b) ingredient being at least 2 to 1.

2. A dispersant composition in accordance with claim 1, wherein M and M' are alkyl amines containing from 1 to 6 carbon atoms, and the amine salt of the alkyl benzene sulfonic acid is an alkyl amine containing from 1 to 6 carbon atoms.

3. A dispersant composition in accordance with claim 1, wherein M is ammonium and M' is isopropylamine, and the amine salt of the alkyl benzene sulfonic acid is isopropylamine.

4. A dispersant composition, having the property of being soluble in organic solvent solutions of water-insoluble biocidal toxicants, comprising (a) a compound in the form of a sulfopolycarboxylic acid ester of an alkylene oxide adduct of a higher molecular weight amine in which the amine contains a hydrocarbon radical having from 8 to 26 carbon atoms, said alkylene oxide being selected from the group consisting of ethylene oxide and propylene oxide subject to the proviso that the number of mols of alkylene oxide per mol of higher molecular weight amine does not exceed 25 when the alkylene oxide is ethylene oxide and does not exceed 10 when the alkylene oxide is propylene oxide, the sulfopolycarboxylic acid radical being represented by the formula

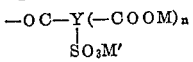

wherein Y is the completely decarboxylated residue of a polycarboxylic acid; M and M' are members of the group consisting of alkali metals and organic substituted ammonium radicals with the proviso that at least one of them is an organic substituted ammonium radical; and $n$ is 1 to 3; and (b) an amine salt of an alkyl benzene sulfonic acid in which the alkyl radical contains from 12 to 18 carbon atoms; the weight ratio of said (a) to said (b) ingredient being at least 2 to 1.

5. A dispersant composition, having the property of being soluble in organic solvent solutions of water-insoluble biocidal toxicants, comprising (a) a compound corresponding to the formula

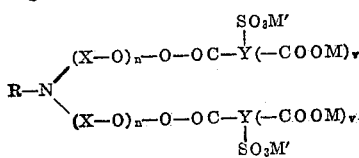

wherein R is an aliphatic hydrocarbon radical containing from 12 to 26 carbon atoms; X is an alkylene radical selected from the group consisting of $C_2H_4$ and $C_3H_6$; Y is the completely decarboxylated residue of a polycarboxylic acid; M and M' are members selected from the group consisting of alkali metals and organic substituted ammonium radicals with the proviso that at least one of them is an organic substituted ammonium radical; and $v$ is 1 to 3; and (b) an amine salt of an alkyl benzene sulfonic acid in which the alkyl radical contains from 12 to 18 carbon atoms; the weight ratio of said (a) to said (b) ingredient being at least 2 to 1.

6. A dispersant composition in accordance with claim 5, wherein M and M' are alkyl amines containing from 1 to 6 carbon atoms, and the amine salt of the alkyl benzene sulfonic acid is an alkyl amine containing from 1 to 6 carbon atoms.

7. A dispersant composition, having the property of being soluble in organic solvent solutions of water-insoluble biocidal toxicants, comprising (a) a compound corresponding to the formula

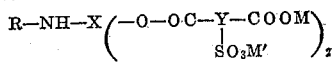

wherein R is an aliphatic hydrocarbon radical containing from 8 to 26 carbon atoms; X is $—CH_2—CH—CH_2—$; Y is the completely decarboxylated residue of a water-soluble polycarboxylic acid containing from 4 to 8 carbon atoms; M and M' are members selected from the group consisting of alkali metals and organic substituted ammonium radicals with the proviso that at least one of them is an organic substituted ammonium radical; and (b) an amine salt of an alkyl benzene sulfonic acid in which the alkyl radical contains from 12 to 18 carbon atoms; the weight ratio of said (a) to said (b) ingredient being at least 2 to 1.

8. A dispersant composition in accordance with claim 7, wherein M is ammonium and M' is isopropylamine, and the amine salt of the alkyl benzene sulfonic acid is isopropylamine.

9. A dispersant composition, having the property of being soluble in organic solvent solutions of organic water-insoluble biocidal toxicants, comprising (a) a compound in the form of a sulfopolycarboxylic acid ester of a 1 to 25 mol ethylene oxide adduct of a higher molecular weight amine in which the amine contains a hydrocarbon radical having from 12 to 26 carbon atoms, the sulfopolycarboxylic acid radical being represented by the formula

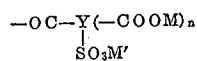

wherein Y is the completely decarboxylated residue of a polycarboxylic acid; M and M' are members of the group consisting of alkali metals and organic substituted ammonium radicals with the proviso that at least one of them is an organic substituted ammonium radical; and $n$ is 1 to 3; and (b) an alkyl amine salt of an alkyl benzene sulfonic acid corresponding to the formula

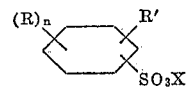

where R is a lower alkyl radical containing from 1 to 3 carbon atoms, R' is a higher alkyl radical containing from 12 to 18 carbon atoms, $n$ is zero to 2, and X is an organic amine cation, the weight ratio of said (a) to said (b) ingredient being at least 2 to 1.

10. A dispersant composition, having the property of being soluble in organic solvent solutions of organic water-insoluble biocidal toxicants, comprising (a) an amine di-salt of a sulfosuccinic acid ester of a 1 to 25 mol ethylene oxide adduct of an aliphatic amine containing a hydrocarbon group of from 12 to 26 carbon atoms, and (b) an amine salt of dodecyl benzene sulfonic acid, the weight ratio of said (a) to said (b) ingredient being at least 2 to 1.

11. A dispersant composition, having the property of being soluble in organic solvent solutions of organic water-insoluble biocidal toxicants, comprising (a) a half alkali metal and half alkyl amine salt of a sulfosuccinic acid ester of 2 to 10 mol ethylene oxide adduct of an aliphatic amine containing from 12 to 18 carbon atoms, and (b) an alkyl amine salt of dodecyl benzene sulfonic acid, the alkyl amine radicals containing from 1 to 6 carbon atoms, the weight ratio of said (a) to said (b) ingredient being from about 2 to about 6 of (a) to 1 of (b).

12. A dispersant composition, having the property of being soluble in organic solvent solutions of organic water-insoluble biocidal toxicants, comprising (a) the half ammonium and half isopropyl amine salt of the sulfosuccinic acid ester of a 2 to 10 mol ethylene oxide adduct of dodecyl amine, and (b) the isopropylamine salt of dodecyl benzene sulfonic acid, the weight ratio of said (a) to said (b) ingredient being from about 2 to about 6 of (a) to 1 of (b).

13. A dispersant composition, having the property of being soluble in organic solvent solutions of organic water-insoluble biocidal toxicants, comprising (a) the half alkali metal and half isopropyl amine salts of sulfosuccinic acid ester of a 1 to 25 mol ethylene oxide adduct of a long chain fatty aminepropyl amine, and (b) the isopropylamine salt of dodecyl benzene sulfonic acid, the weight ratio of said (a) to said (b) ingredient being from about 2 to 6 of (a) to 1 of (b).

14. A dispersant composition, having the property of being soluble in organic solvent solutions of organic water-insoluble biocidal toxicants, comprising (a) the half alkali metal and half isopropylamine salts of sulfosuccinic acid esters of 1 to 25 mol ethylene oxide adducts of long chain amines containing a hydrocarbon radical having from 12 to 26 carbon atoms, and (b) a polyamine salt of dodecyl benzene sulfonic acid, the weight ratio of said (a) to said (b) ingredient being from about 2 to about 6 of (a) to 1 of (b).

15. A dispersant composition, having the property of being soluble in organic solvent solutions of organic water-insoluble biocidal toxicants, comprising (a) an amine salt of a sulfotricarballylic acid ester of a 1 to 25 mol ethylene oxide adduct of an aliphatic long chain amine which contains from 12 to 26 carbon atoms, and (b) an amine salt of dodecyl benzene sulfonic acid, the weight ratio of said (a) to said (b) ingredient being at least 2 to 1.

16. A toxicant concentrate comprising an organic solvent solution of an organic water-insoluble biocidal toxicant and containing, dissolved therein, (a) a compound in the form of a sulfopolycarboxylic acid ester of a higher molecular weight amine in which the amine contains a hydrocarbon radical having from 8 to 26 carbon atoms and in which amine there is present at least one hydroxy alkylene radical selected from the group consisting of hydroxy ethylene and hydroxy propylene, said sulfopolycarboxylic acid radical being ester-linked through the hydroxy group of said hydroxy alkylene radical, the sulfopolycarboxylic acid radical being represented by the formula $$-OC-Y(-COOM)_n$$
$$\quad\;\; | $$
$$\quad SO_3M'$$

wherein Y is the completely decarboxylated residue of a polycarboxylic acid; M and M' are members of the group consisting of alkali metals and organic substituted ammonium radicals with the proviso that at least one of them is an organic substituted ammonium radical; and $n$ is 1 to 3; and (b) an alkyl amine salt of an alkyl benzene sulfonic acid corresponding to the formula (R)$_n$ —⟨ ⟩— R'
           SO$_3$X where R is a lower alkyl radical containing from 1 to 3 carbon atoms, R' is a higher alkyl radical containing from 12 to 18 carbon atoms, $n$ is zero to 2, and X is an organic amine cation, the weight ratio of said (a) to said (b) ingredient being at least 2 to 1, the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

17. A toxicant concentrate in accordance with claim 16, wherein M and M' are alkyl amines containing from 1 to 6 carbon atoms, the amine salt of the alkyl benzene sulfonic acid is an alkyl amine containing from 1 to 6 carbon atoms, and wherein the total of said (a) and (b) ingredients constitutes from 6 to 15%, by weight, of said concentrate.

18. A toxicant concentrate comprising an organic solvent solution of an organic water-insoluble biocidal toxicant and containing dissolved therein, (a) a compound in the form of a sulfopolycarboxylic acid ester of an alkylene oxide adduct of a higher molecular weight amine in which the amine contains a hydrocarbon radical having from 8 to 26 carbon atoms, said alkylene oxide being selected from the group consisting of ethylene oxide and propylene oxide subject to the proviso that the number of mols of alkylene oxide per mol of higher molecular weight amine does not exceed 25 when the alkylene oxide is ethylene oxide and does not exceed 10 when the alkylene oxide is propylene oxide, the sulfopolycarboxylic acid radical being represented by the formula $$-OC-Y(-COOM)_n$$
$$\quad\;\; | $$
$$\quad SO_3M'$$

wherein Y is the completely decarboxylated residue of a polycarboxylic acid; M and M' are members of the group consisting of alkali metals and organic substituted ammonium radicals with the proviso that at least one of them is an organic substituted ammonium radical; and $n$ is 1 to 3; and (b) an amine salt of an alkyl benzene sulfonic acid in which the alkyl radical contains from 12 to 18 carbon atoms; the weight ratio of said (a) to said (b) ingredient being at least 2 to 1.

19. A toxicant concentrate in accordance with claim 18, wherein M is ammonium and M' is isopropylamine, wherein the amine salt of the alkyl benzene sulfonic acid is isopropylamine, and wherein the total of said (a) and (b) ingredients constitutes from 6 to 15%, by weight, of said concentrate.

20. A toxicant concentrate comprising an organic solvent solution of an organic water-insoluble biocidal toxicant and containing, dissolved therein, (a) a compound corresponding to the formula $$R-N \begin{cases} (X-O)_n-O-OC-Y(-COOM)_v \\ \quad\quad\quad\quad\quad\quad\quad\;\; SO_3M' \\ (X-O)_n-O-OC-Y(-COOM)_v \\ \quad\quad\quad\quad\quad\quad\quad\;\; SO_3M' \end{cases}$$

wherein R is an aliphatic hydrocarbon radical containing from 12 to 26 carbon atoms; X is an alkylene radical selected from the group consisting of $C_2H_4$ and $C_3H_6$; Y is the completely decarboxylated residue of a polycarboxylic acid; M and M' are members selected from the group consisting of alkali metals and organic substituted ammonium radicals with the proviso that at least one of them is an organic substituted ammonium radical; and $v$ is 1 to 3; and (b) an amine salt of an alkyl benzene sulfonic acid in which the alkyl radical contains from 12 to 18 carbon atoms; the weight ratio of said (a) to said (b) ingredient being at least 2 to 1.

21. A toxicant concentrate comprising an organic solvent solution of an organic water-insoluble biocidal toxicant and containing, dissolved therein, (a) a compound corresponding to the formula $$R-NH-X\left(-O-OC-Y-COOM \atop \quad\quad\quad\;\; SO_3M'\right)_2$$

wherein R is an aliphatic hydrocarbon radical containing from 8 to 26 carbon atoms; X is —CH$_2$—CH—CH$_2$—; Y is the completely decarboxylated residue of a water-soluble polycarboxylic acid containing from 4 to 8 carbon atoms; M and M' are members selected from the group consisting of alkali metals and organic substituted ammonium radicals with the proviso that at least one of them is an organic substituted ammonium radical; and (b) an amine salt of an alkyl benzene sulfonic acid in which the alkyl radical contains from 12 to 18 carbon atoms; the weight ratio of said (a) to said (b) ingredient being at least 2 to 1, the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

22. A toxicant concentrate comprising an organic solvent solution of an organic water-insoluble biocidal toxicant and containing, dissolved therein, (a) an amine di-salt of a sulfosuccinic acid ester of a 1 to 25 mol ethylene oxide adduct of a long chain amine containing a hydrocarbon radical having from 12 to 26 carbon atoms, and (b) an amine salt of dodecyl benzene sulfonic acid, the weight ratio of said (a) to said (b) ingredient being at least 2 to 1, and the total of said (a) and (b) ingredients constituting from 3 to 15%, by weight, of said concentrate, said concentrate being adapted, upon admixture with aqueous solutions containing upwards of 20% of fertilizer ingredients, to form a homogeneous dispersion usable for periods of the order of at least several hours.

23. A toxicant concentrate comprising an organic solvent solution of an organic water-insoluble biocidal toxicant and containing, dissolved therein, (a) a half alkali metal and half alkyl amine salt of a sulfosuccinic acid ester of a 1 to 25 mol ethylene oxide adduct of a long chain aliphatic amine containing from 12 to 26 carbon atoms, and (b) an alkyl amine salt of dodecyl benzene sulfonic acid, the alkyl amine radicals containing from 1 to 6 carbon atoms, the weight ratio of said (a) to said (b) ingredient being from about 2 to about 20 of (a) to 1 of (b), the total of said (a) and (b) ingredients constituting from 3 to 15%, by weight, of said concentrate, said concentrate being adapted, upon admixture with aqueous solutions containing upwards of 20% of fertilizer ingredients, to form a homogeneous dispersion usable for periods of the order of at least several hours.

24. A toxicant concentrate comprising an organic solvent solution of an organic water-insoluble biocidal toxicant and containing, dissolved therein, (a) the half ammonium and half isopropyl amine salt of a sulfosuccinic acid ester of a 1 to 5 mol propylene oxide adduct of a long chain amine having an aliphatic hydrocarbon radical with from 12 to 18 carbon atoms, and (b) the isopropyl amine salt of dodecyl benzene sulfonic acid, the weight ratio of said (a) to said (b) ingredient being from about 2 to about 20 of (a) to 1 of (b), the total of said (a) and (b) ingredients constituting from 3 to 15%, by weight, of said concentrate, said concentrate being adapted, upon admixture with aqueous solutions containing upwards of 20% of fertilizer ingredients, to form a homogeneous dispersion usable for periods of the order of at least several hours.

25. A toxicant concentrate comprising an organic solvent solution of an organic water-insoluble biocidal toxicant and containing, dissolved therein, (a) a half alkali metal and half alkyl amine salt of the sulfosuccinic acid ester of a 2 to 10 mol ethylene oxide adduct of dodecyl amine, and (b) an alkyl amine salt of dodecyl benzene sulfonic acid, the weight ratio of said (a) to said (b) ingredient being from about 2 to 20 of (a) to 1 of (b), the total of said (a) and (b) ingredients constituting from 3 to 15%, by weight, of said concentrate, said concentrate being adapted, upon admixture with aqueous solutions containing upwards of 20% of fertilizer ingredients, to form a homogeneous dispersion usable for periods of the order of at least several hours.

26. A toxicant concentrate comprising an organic solvent solution of an organic water-insoluble biocidal toxicant and containing, dissolved therein, (a) the half ammonium and half isopropyl amine salt of a sulfosuccinic acid ester of a 1 to 25 mol ethylene oxide adduct of a long chain fatty amine-propyl amine, and (b) the isopropyl amine salt of dodecyl benzene sulfonic acid, the weight ratio of said (a) to said (b) ingredient being about 4 to 10 of (a) to 1 of (b), the total of said (a) and (b) ingredients constituting from 3 to 15%, by weight, of said concentrate, said concentrate being adapted, upon admixture with aqueous solutions containing upwards of 20% of fertilizer ingredients, to form a homogeneous dispersion usable for periods of the order of at least several hours.

References Cited in the file of this patent

UNITED STATES PATENTS

| | | |
|---|---|---|
| 2,976,208 | Lindner | Mar. 21, 1961 |
| 2,976,209 | Lindner | Mar. 21, 1961 |
| 2,976,211 | Lindner | Mar. 21, 1961 |